(12) United States Patent
Parr

(10) Patent No.: US 11,626,215 B2
(45) Date of Patent: Apr. 11, 2023

(54) ILLUMINABLE TETHER MANAGEMENT SYSTEM

(71) Applicant: Alexis B Parr, Burlingame, CA (US)

(72) Inventor: Alexis B Parr, Burlingame, CA (US)

(*) Notice: Subject to any disclaimer, the term of this patent is extended or adjusted under 35 U.S.C. 154(b) by 410 days.

(21) Appl. No.: 16/719,970

(22) Filed: Dec. 18, 2019

(65) Prior Publication Data

US 2020/0211737 A1 Jul. 2, 2020

Related U.S. Application Data

(60) Provisional application No. 62/781,328, filed on Dec. 18, 2018.

(51) Int. Cl.
| | |
|---|---|
| *B64C 39/02* | (2006.01) |
| *B60L 9/00* | (2019.01) |
| *H01B 9/00* | (2006.01) |
| *B66D 1/50* | (2006.01) |
| *G05D 1/00* | (2006.01) |

(52) U.S. Cl.
CPC ............... *H01B 9/005* (2013.01); *B60L 9/00* (2013.01); *B64C 39/022* (2013.01); *B66D 1/505* (2013.01); *G05D 1/0016* (2013.01); *H01B 9/003* (2013.01); *B60L 2200/10* (2013.01)

(58) Field of Classification Search
CPC .......... H01B 9/005; H01B 9/003; B60L 9/00; B60L 2200/10; B60L 2260/32; B64C 39/022; B64C 39/024; B64C 2201/122; B64C 2201/148; B66D 1/505; G05D 1/0016; B64F 3/02
See application file for complete search history.

(56) References Cited

U.S. PATENT DOCUMENTS

| | | | | |
|---|---|---|---|---|
| 2002/0063181 | A1* | 5/2002 | Yamaguchi | A01K 89/05 242/286 |
| 2015/0041598 | A1* | 2/2015 | Nugent | H04B 10/807 244/53 R |
| 2018/0287833 | A1* | 10/2018 | Kennedy | H04L 25/26 |
| 2019/0112048 | A1* | 4/2019 | Culver | B64C 39/024 |
| 2019/0283871 | A1* | 9/2019 | Wieczorek | B64C 39/024 |

FOREIGN PATENT DOCUMENTS

WO WO-2018232010 A1 * 12/2018 ........... B64C 39/022

* cited by examiner

*Primary Examiner* — Michael C Zarroli

(57) ABSTRACT

In one embodiment the disclosure provides a portable and mountable apparatus and method capable of powering and deploying an illuminable tether to an unmanned robotic device (flying drone, ROV, terrestrial robot, to be referred to as a "URD") that not only can provide power and command control to the robotic device, but also receive telemetry back from said robotic device's sensor(s) and data gathering instrumentation transferable to an operator's interface.

20 Claims, 5 Drawing Sheets

200

ILLUMINABLE TETHER MANAGEMENT SYSTEM

BACKGROUND

The present disclosure relates to an Illuminable Tether Management System (ITMS) More specifically, the present disclosure relates to apparatuses and methods of connecting, controlling and powering a properly tensioned illuminable tether to an unmanned robotic device "URD" (in-the-air drone, ROV or terrestrial robot) that simultaneously provides power and command control to the URD and receives back telemetry in the form of sensor(s)/camera(s) data from the URD through said illuminable all in one (see FIG. 4) tether.

SUMMARY

Drones come in many forms: those that operate in the water (ROV's), others that operate on land or underground (terra-based) and those that operate in the air. As they are all robotic devices we will call them Unmanned Robotic Devices (URD). Some of these drones operate autonomously but many others operate through the use of a tether that simultaneously provides power and command control to the URD and securely transmits telemetry back from the URD to an operators interface.

The benefits of a tether are vast. Not only can they power the URD indefinitely (provided they are connected to an unlimited electrical power source) but they allow for continuous secure, un-hackable telemetry to be transferred back from the URD's sensor systems. Another benefit of a tether is that they can limit the distance the URD can travel and harness it from flying, swimming or crawling away which can lead to large problems of potential danger to others, other property and the URD itself.

Those that make the argument for the benefit of a tethered URD system say that a huge benefit is allowing for persistency of operation for the URD. As an example, flying URD can typically only stay aloft for about 30 minutes due to battery size/weight/capacity limitations. They would also say that if a persistent or longer observation window is needed than current autonomously powered URD can provide, then the tether can provide for that unending supply of power to keep that URD on task and operating, without having to change out batteries or power source.

Telecom companies have used tethered systems they call COW's (Cell On Wheels) to be able to deploy them in devastated areas to provide much needed cell connectivity and service to the area that has lost its service and connectivity because of a disastrous (man-made or weather) event. Persistency implies both day and night operation and this is where the ITMS's capabilities make it unique. Whether underground (where there is no natural light, at depth (where at about 800 feet down below the water's surface there is virtually no light even if it's high noon on a sunny day) or in the air with low visibility conditions such as nighttime or other pollution in the air, the ability to have real time spatial and situational awareness of the tether's position is vital. In the example of the COWs, that hovering URD is providing vital connectivity to an area where rescue work is going on and therefore, keeping that vital tether (that is powering the URD and providing the connectivity) sacrosanct is key and could mean the difference between life and death when every second counts responding to disasters.

The failing of all the other tether systems currently is they do not pay out and power an all-in-one self-illuminable tether depicted in FIG. 4. An illuminable tether does triple duty in one profile as compared to a standard tether: 1) it conveys the data and power that a regular tether does, 2) It announces and demarks its location so that it has a better chance of not being violated, snagged or cut in hard to see environments, and 3) It provides an illuminable follow-able pathway for inter-actors back to the entrance/starting point of the URD's deployment which is usually a safer location. With a tether being so thin it is easy to understand how someone or something may entangle or snare it. In the case of an in-the-air URD other flying URD in the area could fly right into the tether disrupting the vital connectivity it's providing. With something so thin the sense and avoid" paradigm is seriously enhanced by SEE and avoid.

ITMS will provide a tether management system that conveys the power, command control, receives the telemetry in a secure and continuous manner and incorporates a winch system that pays out an illuminable tether in a properly tensioned managed manner that increases the probability that the tether does not get violated. This system will allow operators to use their eyes (80% of input to the brain is visual) or other URD sensors to identify and see the tether and avoid it.

Fire fighting companies are utilizing flying tethered URD systems to be able to get a birdseye view of a conflagration to be able to better assess options for rescue, identify hot-spots and have an improved perspective of the situation. If they are fighting the blaze through the night then the illuminable tether that the ITMS would deploy would allow other assets in the area (ladder trucks, other flying URD, helicopters etc.) to much more easily stay clear of the vital tether providing the secure real-time information, data and images to those trying to mitigate the losses of property and life. Another benefit of the illuminable tether is that it would act as a beacon in the sky giving positional awareness to those in the area of the deployment zone.

Terrestrial URD and those that operate underwater (ROVs) are often interacted with by humans in their local operating space. Whether it's troops or law enforcement officers searching tunnels or divers being able to follow or quickly locate an ROV that has alerted them of a situation needing attention (i.e. a trapped survivor in an air pocket or a sub-sea mine that needs deactivating, being able to see and follow that continuously illuminated tether expedites and makes more safe these various operators paths of operation. When every second counts, (for both the operators/rescuers and the potential victims) allowing these interactors (be they human or other URD's equipped with sensors) the ability to follow an illuminated pathway in the dark can mean the difference between life and death, safety and disaster. The ITMS will be a tether management system that does what others do but will deploy a 360 degree light-emitting, cool-to-the-touch, flexible, weather-proof, The ITMS will be a tether management system that does what others do but will deploy a 360 degree light-emitting, cool-to-the-touch, flexible, weather-proof, data/comm./control/power conveying profile that is quickly deployable and re-spoolable. The ITMS will include a ground payload interface unit or port that will be able to transfer the telemetry to a user interface unit such as a laptop or other device either by wire or wirelessly.

DETAILED DESCRIPTION

Figure 1:
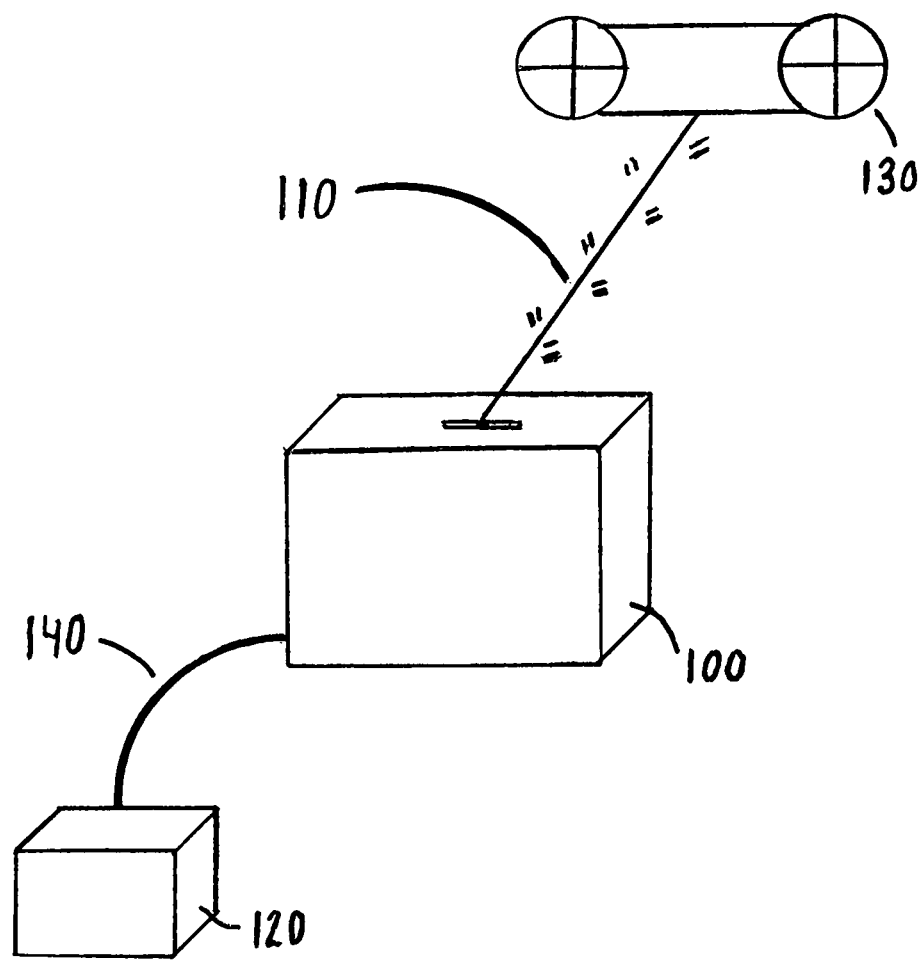
FIG. 1 Illustrates an Illuminable Tether Management System.
Figure 2:
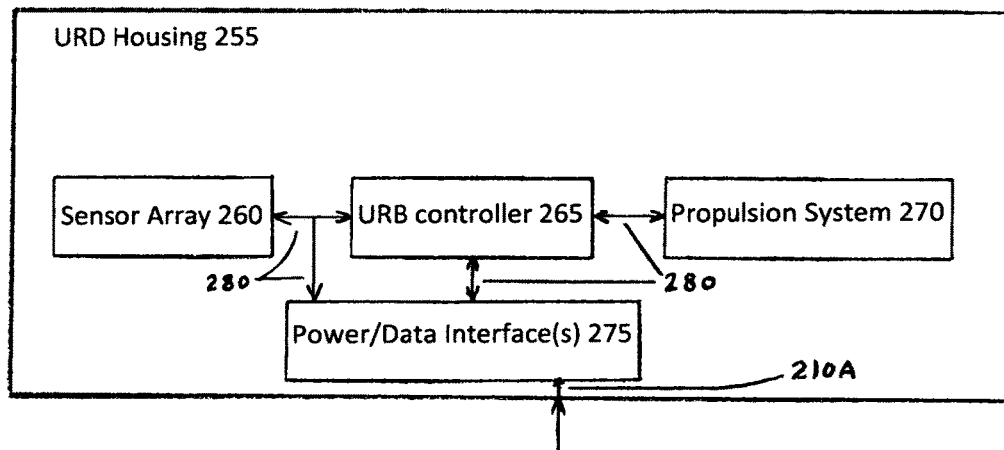
FIG. 2. Is a flow diagram of an ITMS according to some embodiments.
Figure 2:
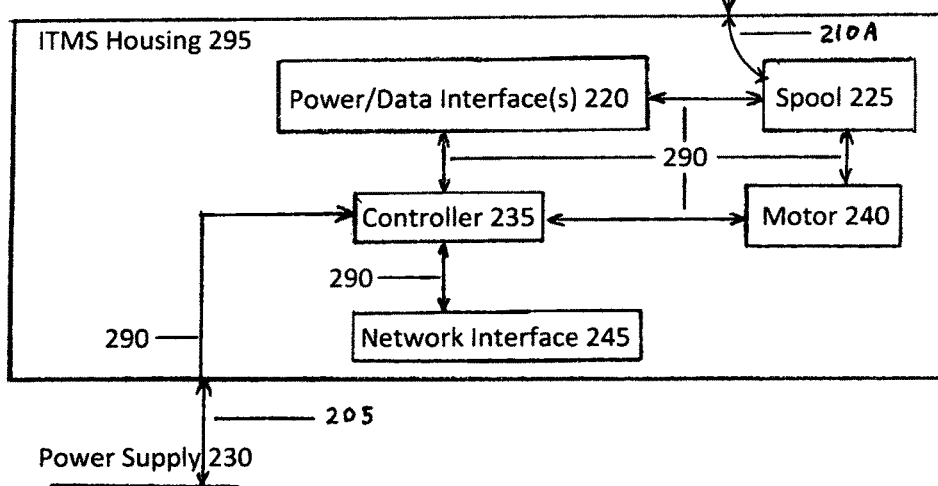

In a preferred embodiment, the disclosure provides a method of utilizing Alternating Current (AC) from either a generator or the grid (350) to connect to the ITMS (302) which then can, through the use of transformers and inverters contained within the Power Conversion Circuitry (338), convey the proper needed voltage and frequency to meet the load requirements of the tether's light emitting layer through the properly tensioned load requirements of the tether's light emitting layer through the properly tensioned tether (352A) to the power/data interface (370) of the URD (350) as well as to the URD's propulsion system (394) through the use of slip ring assemblies which contain a rotating portion attached to the payout spool and a stationary stator portion affixed within the ITMS housing (304).) The tether maintains proper tension below the tensile breaking threshold of the tether (352A) because of the tensioning device (334) which is controlled by the Motor Control Unit (MCU) and spool (348) that may be configured for electronic breaking or by using a clutch/gear system to keep proper tension on the tether to account for varying wind conditions or uneven ground/sea conditions the ITMS housing (304) is being subjected to. Although a clutched/geared spool, motor and electronic breaking is described herein, any suitable tensioning or tether adjustment mechanisms may be utilized.

In some embodiments, the disclosure provides a method of utilizing a Direct Current (DC) source (354) such as a battery or bank of batteries to connect to the ITMS (302) which by passing through the Power Conversion Circuitry (338) utilizing a boost converter(s) and inverter(s) can convey the proper needed voltage and frequency to meet the load requirements of the light emitting layer of the properly tensioned tether (352A) because of the tensioning device (334) and through the tether to the power/data Interface (370) to power the URD's (350) propulsion system (390) as well, through the use of slip ring assemblies which contain a rotating portion attached to the payout spool and a stationary stator portion affixed within the ITMS housing (304).

Figure 3:
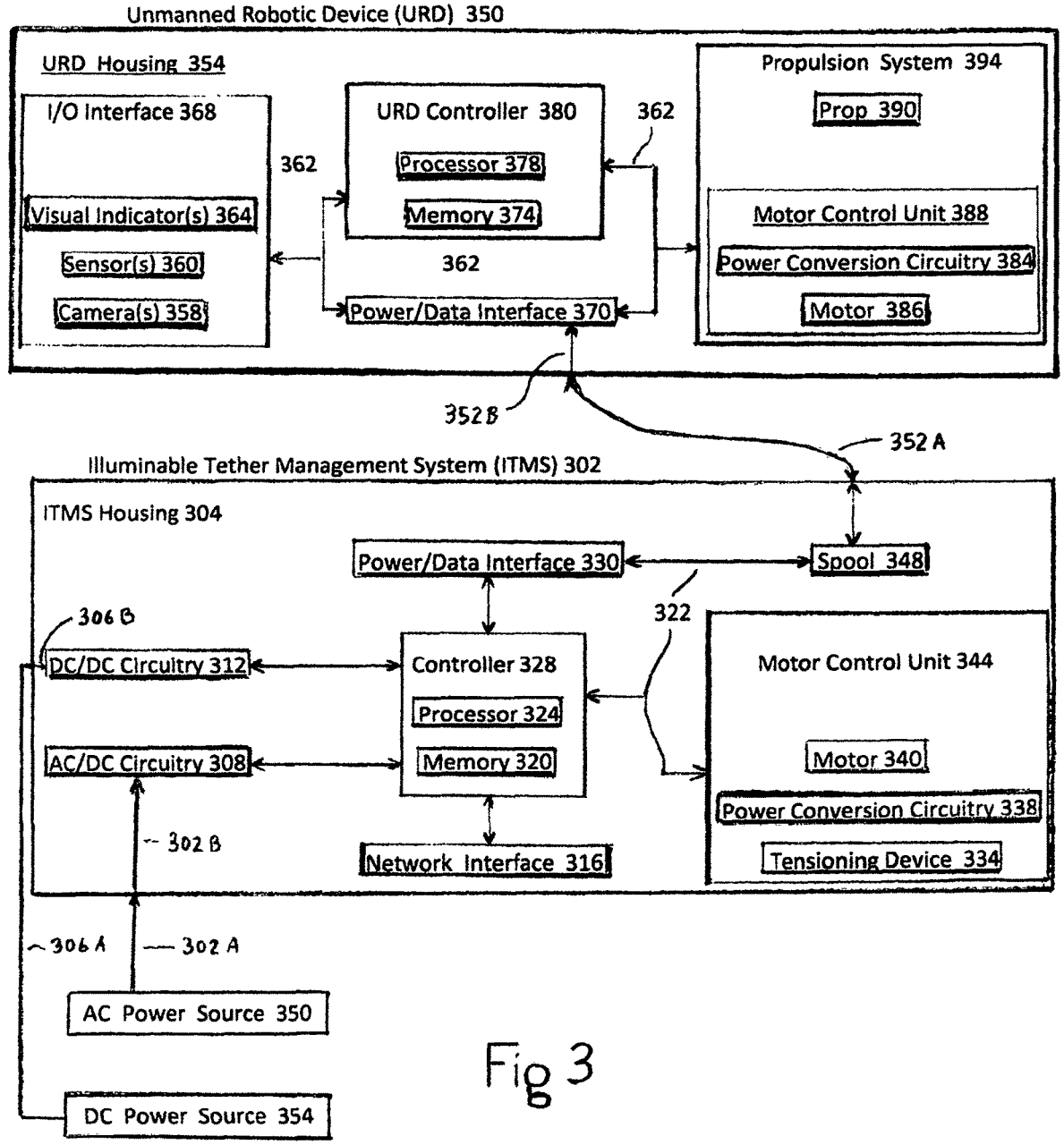
FIG. 3. Is a flow diagram of an ITMS according to some embodiments.

In some embodiments, the disclosure provides a method of receiving and transferring telemetry and sensor(s) data from the URD's (350) I/O interface (368) through the power/data interface (370) through the use or one or more fiber optic cables that are embedded within the illuminable tether (352A) connected to a power/data interface (330) through the use of a slip ring assemblies connected to the spool (348) to be able to convey the data to the network interface (316) as shown in FIG. 3.

Figure 5:
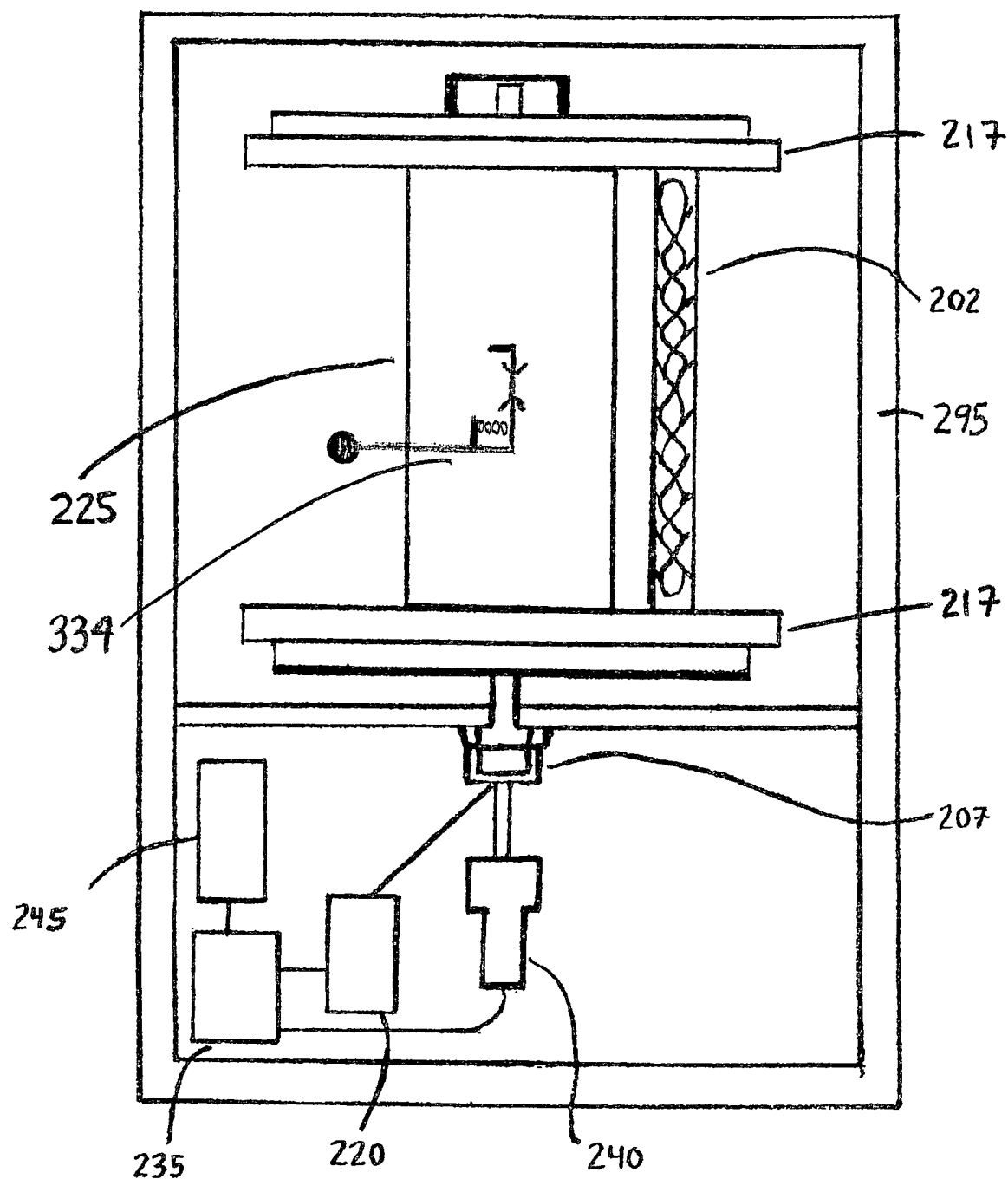
FIG. 5. Illustrates an ITMS according to some embodiments.

As shown in FIG. 5 some embodiments of the ITMS contained within a housing (295) that can be made from metal, resin, carbon fiber, plastic or other will have a winch spool (225) mounted between a frame assembly (217) opposed by a level-wind wormshaft (202) which will allow the tether to be respooled in an even level manner. The ITMS will house a controller (235), Power/data interface(s) (220) and a network interface (245). The tether's power, data and light emitting conveyances will connect through to the tether by use of slip ring assembly(ies) (207).

Figure 4:
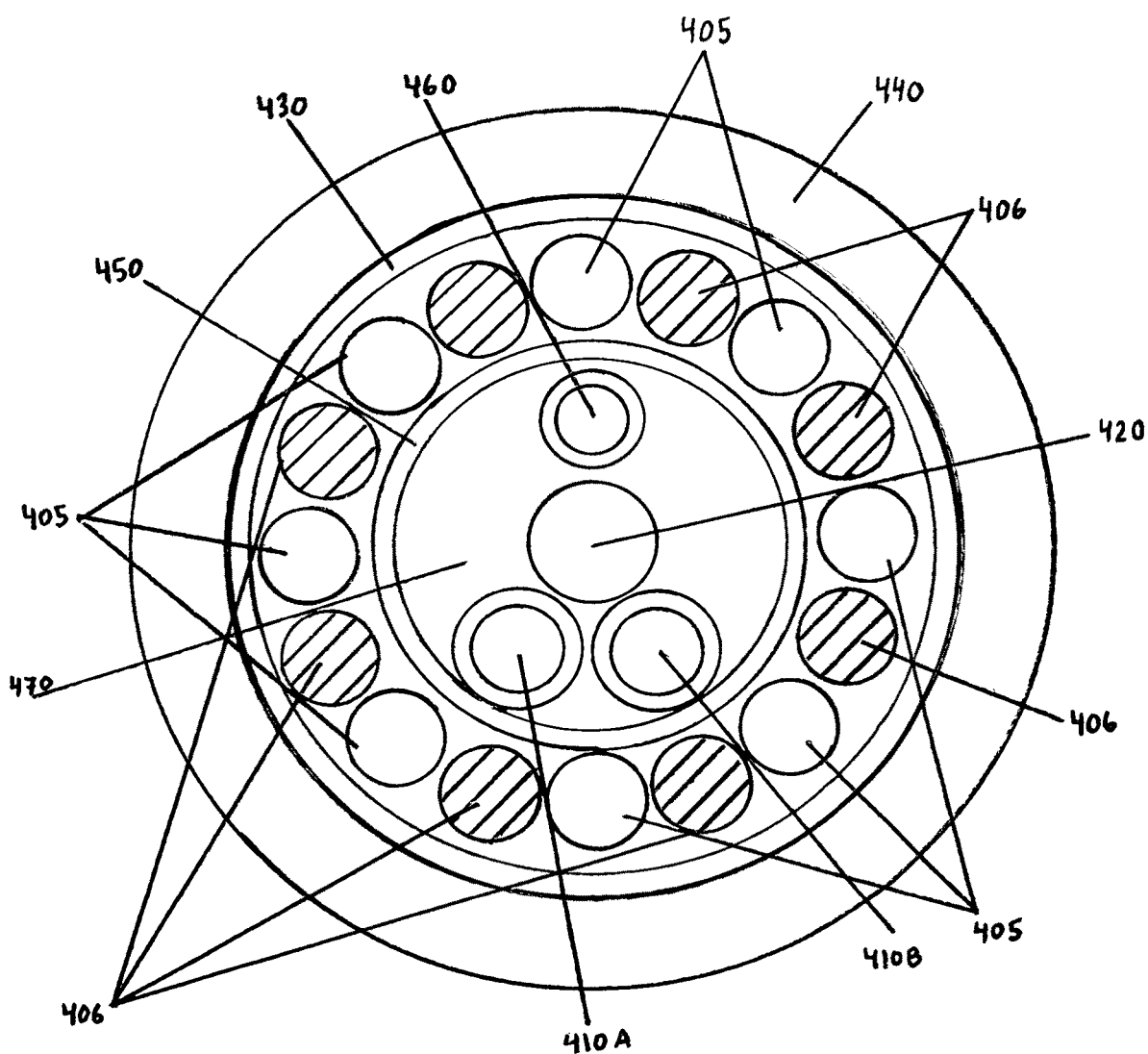
FIG. 4. Illustrates a cross-sectional view of an illuminable tether, according to some embodiments.

In some embodiments the all-in-one illuminable tether (FIG. 4) may comprise various data and power conveyances as detailed in FIG. 4. The center of the core may comprise a stretch-resistant strength element made from a Kevlar, graphene, aramid fiber (or other strong stretch-resistant material) bundle or tube (420). In some embodiments a twisted pair of conductors (460) will convey the electrical voltage and current needed to power the URD. In some embodiments the illuminable tether will have redundant fiber optic cables (410A and 410B) separated from the conductors powering the light emitting layer (405 and 406) by a dialectric layer ((450). The light emitting layer's energizing conductors (405 and 406) are coated with a light emitting phosphor layer (430) to be jacketed by and outer polymer layer (e.g. polyurethane, PVC, etc.) (440) that allows the light to pass through it.

In some embodiments, the disclosure provides a method of receiving and transferring camera(s) data and images from the URD (350) I/O interface (368) and Power/data interface (370) through conveyances such as fiber optic cables embedded within the illuminable tether (352A) connected to a power/data interface (330) via slip ring assemblies connected to the spool (348) to be able to convey the data to the network interface (316).

In some embodiments the ITMS (302) can be mounted to and deployed from a vehicle.

In some embodiments the light emitting layer FIG. 4 (430) of the tether (352A) can emit light in the IR spectrum.

In a preferred embodiment the (as shown in FIG. 1) the ITMS (100) will connect to an outside power source (120) through a power cable (140) and deploy an illuminable tether (110) to a URD (130).

In some embodiments the ITMS can convey command control to the URD via active conductors (460). As such, a remote control of power and telemetry can be conveyed to the URD (130) via the illuminable tether (110). Moreover the delivered power may be a multi-phase power signal.

In some embodiments, the controller (328) which is connected to the URD (350) through the illuminable tether (352A) is used by a user to trigger and control via buttons a URD (350) launch from its starting point and its return as well as its aspect or altitude in the case of a flying URD or its depth and aspect in the case of an underwater URD (350).

What is claimed is:

1. A portable and mountable Illuminable Tether Management System (ITMS);
    capable of conveying the required amount of power and frequency, be it Alternating Current (AC) or Direct Current (DC),
    through a deployable, tension and deployed length controllable, cool to touch, illuminable tether with;
        embedded data and power conveyance conductors and fiber optic members and
        supply tube(s) that can add tensile and breaking strength, that run down the center core of said tether encircled by a 360-degree, light-emitting layer connectable on one end—a first end—to the ITMS and the other end—second end—attachable to an Unmanned Robotic Device (URD);
    transmit the required power consistent with the electrical load requirements for all operational components of the URD as well as featuring a connected power supply (inverter) that supplies the light-emitting layer's coated energizing conductors the frequency and AC voltage and wattage the light-emitting layer requires and command control through said illuminable tether to a URD and simultaneously receive back telemetry and sensor(s) data from the URD in a continuous method through a flexible, 360-degree light emitting—when turned on—easily and quickly spoolable and unspoolable tether, all in one profile with said telemetry/data transmittable to an operator's interface.

2. The system of claim 1 wherein the ITMS housing is attachable to a manned vehicle.

3. The system of claim 1 wherein detecting abnormal movement of the URD comprises: measuring a tension lever of the tether; making a determination that the measured tension level is below an upper threshold tension level.

4. The system of claim 1 wherein the spooling of the tether occurs in an even level winding aspect through the use of a wormshaft.

5. The system of claim 1 wherein the no heat emitting light emanating from the tether in 360 degrees is in the Infra Red (IR) wavelengths.

6. The system of claim 1 wherein a gas, foam, liquid or fuel can be pumped through a supply tube embedded within the illuminable tether profile.

7. The system of claim 1 wherein an inverter for the illumination portion—the tether's 360 degree light emitting layer—is attachable to the URD.

8. The system of claim 1 wherein an active auto-tensioning system spring loaded lever is employed so that the ITMS always maintains/adjusts the proper tension to the URD to mitigate unnatural movements caused by outside forces (e.g. wind, currents, uneven terrain etc.).

9. The system of claim 1 wherein the ITMS can power and control multiple URD through the use of a manifold connector attached to the second end of the tether through which power and telemetry can flow to multiple URD through additional tether lengths.

10. The system of claim 1 wherein the functions of the ITMS can be controlled and operated remotely.

11. A portable and mountable Illuminable Tether Management System (ITMS);
   capable of conveying proper power, be it AC or DC, through a quickly deployable, controllable tension and controllable length, cool to touch, and illuminable tether with
      embedded data and power conveyances that run down the center core of said tether and connectable on one end (first end) to the ITMS and on the other end (second end) attachable to the first side of a coupling device that can house
         high visibility strobe light bulb(s) or diode(s) within it but allows another length of the illuminable tether to be connected to the second side of said coupling device to be able to connect to another coupling device or an unmanned robotic device (URD) to transmit necessary amount of power be it alternating current (AC) or direct current (DC) and command control through said illuminable tether to said URD as well as simultaneously receive back telemetry and sensor(s) data from the URD in a continuous method through a flexible, 360 degree light emitting (when turned on) and spool-able profile with said data transmittable to an operator's interface.

12. The system of claim 11 wherein the tether deployed from the ITMS is attachable to a manned vehicle.

13. The system of claim 11 wherein detecting abnormal movement of the robotic device comprises: measuring a tension lever of the tether; making a determination that the measured tension level is below an upper threshold tension level.

14. The system of claim 11 wherein the spooling of the tether occurs in an even (level) winding aspect through the use of a wormshaft.

15. The system of claim 11 wherein the light emanating from the tether and strobe(s) is in the Infra Red (IR) wavelengths.

16. The system of claim 11 wherein an inverter for the illumination portion—the tether's 360 degree light emitting layer—is attachable to the URD.

17. The system of claim 11 wherein an active auto-tensioning system system spring loaded lever is employed so that the ITMS always maintains/adjusts the proper tension to the URD to mitigate unnatural movements caused by outside forces (e.g. wind, currents, uneven terrain etc.).

18. The system of claim 11 wherein a gas, foam, liquid or fuel can be pumped through a tube at the center of the tether profile.

19. The system of claim 11 wherein the ITMS can power and control multiple URD through the use of a manifold connector attached to the second end of the tether through which power and telemetry can flow to multiple URD through additional tether lengths.

20. The system of claim 11 wherein the functions of the ITMS can be controlled and operated remotely.

* * * * *